(12) United States Patent
Alaze et al.

(10) Patent No.: US 7,779,748 B2
(45) Date of Patent: Aug. 24, 2010

(54) PISTON PUMP

(75) Inventors: Norbert Alaze, Markgroeningen (DE); Horst Beling, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 11/721,985

(22) PCT Filed: Nov. 2, 2005

(86) PCT No.: PCT/EP2005/055710

§ 371 (c)(1), (2), (4) Date: Jun. 18, 2007

(87) PCT Pub. No.: WO2006/066996

PCT Pub. Date: Jun. 29, 2006

(65) Prior Publication Data

US 2009/0274568 A1    Nov. 5, 2009

(30) Foreign Application Priority Data

Dec. 22, 2004  (DE) ............ 10 2004 061 814

(51) Int. Cl.
*F16J 1/10* (2006.01)
*F16J 15/18* (2006.01)
(52) U.S. Cl. ................... 92/129; 92/165 R
(58) Field of Classification Search ........... 92/129, 92/165 R, 168; 277/435, 436, 437, 438, 277/439, 551, 567, 572
See application file for complete search history.

(56) References Cited

U.S. PATENT DOCUMENTS

| | | | |
|---|---|---|---|
| 6,164,659 A * | 12/2000 | Netzer et al. | 277/437 |
| 6,283,733 B1 * | 9/2001 | Merklein et al. | 92/78 |
| 6,341,950 B1 | 1/2002 | Schuller et al. | |
| 6,394,770 B1 | 5/2002 | Siegel et al. | |

FOREIGN PATENT DOCUMENTS

| | | |
|---|---|---|
| DE | 3707913 A1 | 10/1987 |
| DE | 19752546 A1 | 9/1998 |
| EP | 1022468 A2 | 7/2000 |
| EP | 1058017 A2 | 12/2000 |
| EP | 1082544 B1 | 11/2003 |
| JP | 7269441 A | 10/1995 |
| JP | 11257245 A | 9/1999 |
| JP | 2000213468 A | 8/2000 |
| JP | 2003320558 A | 11/2003 |

* cited by examiner

*Primary Examiner*—Michael Leslie
(74) *Attorney, Agent, or Firm*—Ronald E. Greigg

(57) ABSTRACT

A piston pump, having a pump housing in which a pump piston is guided in an axially moving fashion so that when the pump piston is actuated, a fluid is conveyed from a suction side to a pressure side via a pumping chamber that adjoins the pump piston; a region for guiding the pump piston in the pump housing includes a guide ring, which is provided with a sealing section and is affixed to the pump housing.

7 Claims, 2 Drawing Sheets

PISTON PUMP

CROSS-REFERENCE TO RELATED APPLICATION

This application is a 35 USC 371 application of PCT/EP 2005/055710 filed on Nov. 2, 2005.

BACKGROUND OF THE INVENTION

1. Field of the Invention

The invention is directed to an improved piston pump of the type used, for example, as a component of a hydraulic system.

2. Description of the Prior Art

A piston pump of the type with which this invention is concerned is known from the industry and is, for example, a component of a hydraulic system of an electronic driving stability system of a motor vehicle. The known piston pump has a pump housing in which a pump piston is guided in an axially moving fashion so that when the pump piston is actuated, a fluid is conveyed from a suction side of the pump to a pressure side of the pump via a pumping chamber that adjoins the pump piston. In this case, the pump piston is preferably guided in the housing by means of a guide ring that is press-fitted into the housing. For sealing purposes, the pump has a sealing ring that is situated in the vicinity of the guide ring and is supported against the guide ring by means of a support ring.

The sealing and guidance of the piston is thus disadvantageously comprised of at least three components, each of which must be separately installed in the relevant region of the housing, thus complicating the assembly of the piston pump as a whole and negatively influencing the manufacturing costs in a corresponding fashion.

The object of the present invention, therefore, is to refine a piston pump of this type, particularly with regard to a simplified assembly.

SUMMARY AND ADVANTAGES OF THE INVENTION

The piston pump according to the invention, with a region for guiding the pump piston in the pump housing that includes a guide ring that is provided with a sealing section and is affixed to the pump housing has the advantage that in the relevant housing region provided to guide the piston in the housing, only a single component has to be installed in order on the one hand to assure a guidance of the piston in the housing and on the other hand to seal the guide region.

The piston pump according to the invention can in particular be used as a pump in a motor vehicle brake system and in this case, can be used to control the pressure in the wheel brake cylinders.

For example, the piston pump according to the invention is used in a brake system with a wheel slip control system of the kind comprising part of an antilock brake system (ABS) or a traction control system (TCS), for example, both of which can be connected to an electronic stability program (ESP). A wheel slip control system is able to prevent motor vehicle wheels from locking during a braking maneuver in an antilock brake system, for example, and is able to prevent the driven wheels of the motor vehicle from spinning in a traction control system. In the case of an antilock brake system, the pump is then used, for example, to convey brake fluid to a master cylinder from one or several wheel brake cylinders and/or in the case of a traction control system, the pump is used to convey brake fluid from a reservoir into one or several wheel brake cylinders.

The pump also performs the latter function when used in an eletrohydraulic brake system (EHB) or an electronic stability program (ESP). When the pump is used in connection with an electrohydraulic brake system, the pump delivers brake fluid to the wheel brake cylinder or cylinders when an electric brake pedal sensor detects an actuation of the brake pedal. In a brake system used to assist steering or an electronic stability program (ESP), a brake pressure is built up in one or more wheel brake cylinders independent of an actuation of the brake pedal or gas pedal in order to prevent the vehicle from swerving out from the path selected by the driver.

The pump can also be used to fill any kind of reservoir in the brake system.

The sealing section with which the guide section is provided is preferably embodied in the form of a region of the guide ring that is extrusion-coated with a rubber elastic material; the extrusion-coated region rests against the pump piston on one side and against the pump housing on the other. The rubber elastic material assures a prestressing of the sealing element in the sealing direction so that the desired sealing action is achieved.

A plastic or a rubber can be used as the elastic material. In particular, the elastic material can be comprised of a filled or unfilled polyamide or PEEK (polyether ether ketone).

In order to be able to assure the prestressing of the sealing section in the sealing direction over a long period of time, the guide ring is preferably produced out of a spring steel sheet. Because at least one spring element is embedded in the sealing section, it is thus possible to compensate for the fact that the prestressing of the sealing section made of a rubber elastic material diminishes over its service life.

In an advantageous embodiment of the piston pump according to the invention, the sealing section has an essentially U-shaped cross-section in which one of the freely extending U legs of the sealing section rests against the pump housing and the other freely extending U leg rests against the pump piston.

In a special embodiment of the piston pump according to the invention, the essentially U-shaped cross-section is predetermined by tabs of the guide ring that are arranged in alternating fashion on the inside and the outside.

A guide ring made of spring steel sheet thus has a multitude of spring elements that are embedded in or cast into the rubber elastic material in the region of the sealing section so that the rubber elastic material is pressed in a prestressed fashion against the sealing surfaces. This yields a sufficient sealing action both in the presence of powerful primary pressures and in the presence of negative pressure, which can occur during operation of the piston pump. This makes it possible to prevent a leakage in the region of the sealing section and also avoids the risk of a suction of air along the sealing section.

In order to assure a wear-resistant guidance of the pump piston, the guide ring can be made of a hardened sheet metal, in particular a hardened spring steel sheet.

During installation of the guide ring and the pup piston in the pump housing, the spring elements injection-molded into the rubber elastic material are prestressed. The dimensionally accurate guide diameter of the guide ring is only produced once the guide ring has been press-fitted into the pump housing.

BRIEF DESCRIPTION OF THE DRAWINGS

An exemplary embodiment of a piston pump according to the invention and will be explained in detail in the subsequent description with reference to the drawings, in which.

DESCRIPTION OF THE PREFERRED EMBODIMENT

Figure 1:
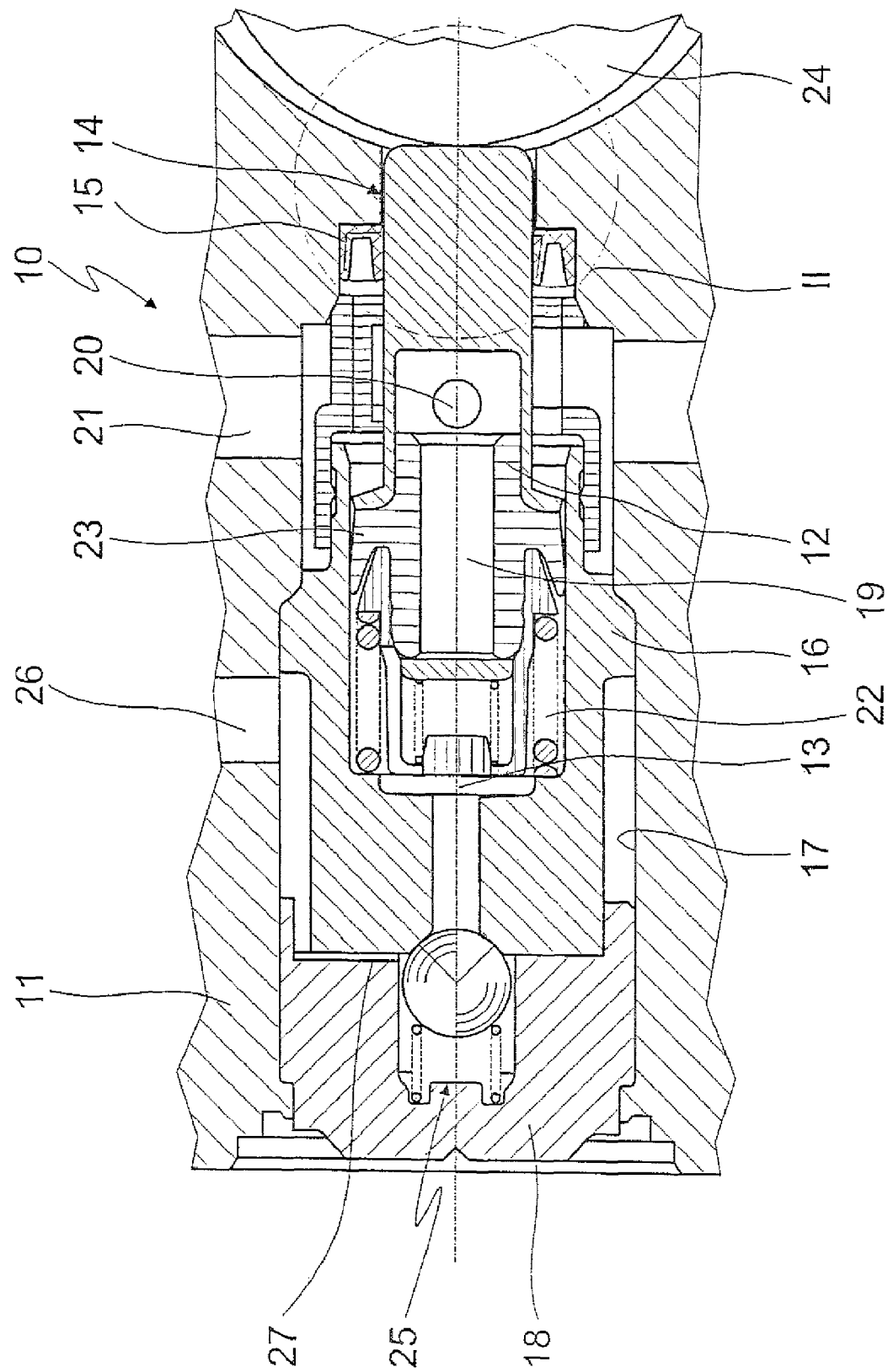
FIG. 1 shows a simplified longitudinal section through a piston pump according to the invention.

FIG. 1 shows a piston pump 10 that is integrated into a hydraulic block that comprises a pump housing 11. The hydraulic block is a component of an electrohydraulic vehicle brake system and in addition to the piston pump, optionally includes additional piston pumps of the same type and additional components such as solenoid valves or accumulators that can be hydraulically connected to one another and can be connected to the piston pump 10 shown in the drawing.

The piston pump 10 is provided with a multi-part pump piston 12 whose end oriented away from a displacement/pumping chamber 13 is guided in the pump housing 11 by means of a guide ring 14 that is provided with a sealing section 15. An end of the pump piston 12 oriented toward the displacement chamber 13 is guided in a sealed fashion by an annular collar 23 in a sleeve 16 that is fitted into a housing bore 17 and is fixed in position by a so-called outlet valve cover 18 that also serves as a stopper element for the pump 10 integrated into the hydraulic block.

In the pump piston 12, a blind hole-like axial conduit 19 is provided, which communicates via transverse bores 20 with an inlet conduit 21 that constitutes a suction side of the piston pump 10. During the intake phase, fluid is drawn into the displacement chamber 13 from the inlet conduit 21 via the transverse bores 20 and the axial conduit 19.

The pump piston 12 is actuated by means of a cam 24 that can be driven to rotate in an electromotive fashion; a return spring 22 presses the pump piston 12 against the cam 24 in the axial direction by means of the annular collar 23 provided for guidance in the sleeve 16. The cam 24 drives the pump piston 12 to execute a reciprocating motion that produces the pumping action.

The outlet valve cover 18 contains an outlet valve 25 embodied in the form of a check valve, which controls a fluid flow between the displacement chamber 13 and an outlet conduit 26 that comprises a pressure side; between the outlet valve 25 and the outlet conduit 26, there is a connecting conduit 27, which is embodied in the form of a channel-like recess in the end surface of the outlet valve cover 18 oriented toward the sleeve 16.

Figure 2:
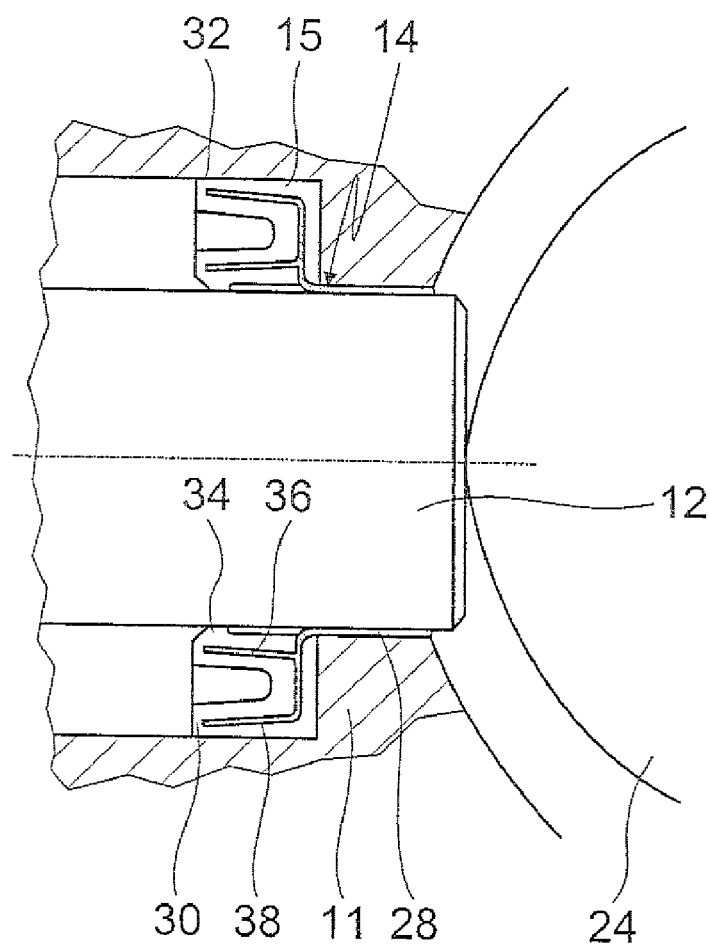
FIG. 2 is an enlarged depiction of the region II encircled with dashed lines in FIG. 1.
Figure 3:
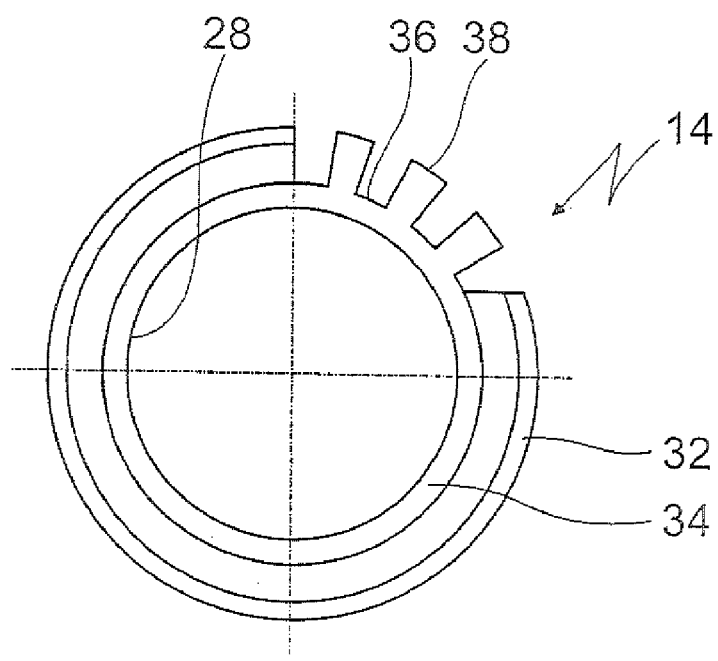
FIG. 3 is a top view of a guide ring for a pump piston that is shown in a region without plastic extrusion coating to make the explanation clearer.

As is particularly clear from FIGS. 2 and 3, the guide ring 14 has a guide region 28, which is press-fitted into the housing 11 in order to guide the piston 12 in the housing 11, is comprised of a hardened spring steel sheet, extends into the sealing section 15, and constitutes an insert piece therein for a sealing element 30 comprised of filled polyamide and predetermines its U-shaped cross-section; an outer leg 32 of the sealing element 30 rests against the housing 11 and an inner leg 34 rests against the piston 12. The U-shaped cross-section of the sealing element 30 is predetermined by tabs 36 and 38 of the spring steel sheet that are arranged in alternating fashion on the inside and the outside. The inner tabs 36 and the outer tabs 38 are formed by means of so-called notches in the spring steel sheet.

The foregoing relates to a preferred exemplary embodiment of the invention, it being understood that other variants and embodiments thereof are possible within the spirit and scope of the invention, the latter being defined by the appended claims.

The invention claimed is:

1. A piston pump, comprising a pump housing a pumping chamber in the pump housing adjoining a pump piston which is guided in an axially moving fashion in the pump housing so that when the pump piston is actuated, a fluid is conveyed from a suction side to a pressure side via the pumping chamber and a guide region in the pump housing for guiding the pump piston in the pump housing, the guide region including a guide ring made of spring steel sheet, said guide ring being provided with a sealing section and being affixed to the pump housing.

2. The piston pump according to claim 1, wherein the sealing section includes a sealing element comprised of a rubber elastic material that constitutes an extrusion coating of the guide ring and rests against the pump piston and the pump housing.

3. The piston pump according to claim 1, wherein the sealing section has an essentially U-shaped cross-section.

4. The piston pump according to claim 2, wherein the sealing section has an essentially U-shaped cross-section.

5. The piston pump according to claim 3, wherein the essentially U-shaped cross-section of the sealing section is predetermined by tabs of the guide ring that are arranged in alternating fashion on the inside and the outside.

6. The piston pump according to claim 4, wherein the essentially U-shaped cross-section of the sealing section is predetermined by tabs of the guide ring that are arranged in alternating fashion on the inside and the outside.

7. A piston pump, comprising a pump housing a pumping chamber in the pump housing adjoining a pump piston which is guided in an axially moving fashion in the pump housing so that when the pump piston is actuated, a fluid is conveyed from a suction side to a pressure side via the pumping chamber, a guide region in the pump housing for guiding the pump piston in the pump housing, the guide region including a guide ring, which is provided with a sealing section and which is affixed to the pump housing, wherein the sealing section has an essentially U-shaped cross-section which is predetermined by tabs of the guide ring that are arranged in alternating fashion on the inside and the outside.

* * * * *